Feb. 9, 1943.  K. W. MONTGOMERY  2,310,307
VIEW FINDER REFLECTOR FOR CAMERAS
Filed May 17, 1940

INVENTOR.
KENNETH W. MONTGOMERY
BY Maurice J. Fletcher
ATTORNEY.

Patented Feb. 9, 1943

2,310,307

UNITED STATES PATENT OFFICE 2,310,307

VIEW FINDER REFLECTOR FOR CAMERAS

Kenneth W. Montgomery, Des Moines, Iowa

Application May 17, 1940, Serial No. 335,755

1 Claim. (Cl. 88—1.5)

The principal object of this invention is to provide a reflector unit to be used in conjunction with the view finder of a camera for permitting the operator to take pictures at right angles to his line of vision.

A further object of this invention is to provide an angular reflector unit for cameras which will increase the usefulness of a candid type camera, that is novel, and one which may be easily secured to a camera.

A still further object of this invention is to provide a view finder reflector for cameras that is economical in manufacture, durable and efficient in use.

These and other objects will be apparent to those skilled in the art.

My invention consists in the construction, arrangement and combination of the various parts of the device, whereby the objects contemplated are attained as hereinafter more fully set forth, pointed out in my claim and illustrated in the accompanying drawing, in which:

One of the principal diversions or uses of a candid camera is in the taking of entirely candid camera snap shots and a great pastime and hobby has arisen in this field. In fact, the candid camera is so prominent that it is sometimes difficult to obtain candid camera snapshots of individuals, inasmuch as they suspect that their picture is being taken. It is in order to aid the candid camera user in obtaining candid camera snapshots that I have provided my view finder reflector for cameras which I will now describe.

Figure 1:
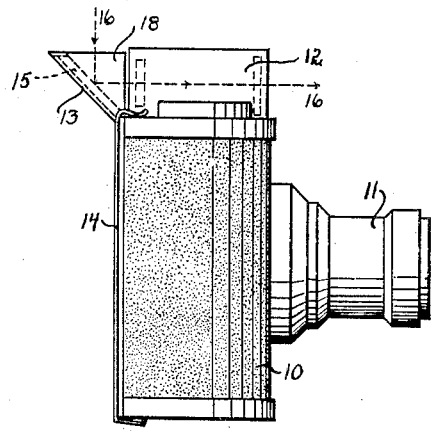
Fig. 1 is a side elevational view of a candid type camera with my reflector unit thereon.
Figure 3:
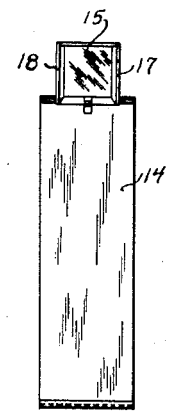
Fig. 3 is a front elevational view of the reflector unit detached from the camera.

Referring to the drawing, I have used the numeral 10 to indicate a camera having the lens 11 and the ordinary eye-level view finder 12 thereon. It is to such a camera and in conjunction with such a view finder that I use my device, which I will now describe. I have used the numeral 13 to indicate a base portion having integrally formed thereon a clamping means 14. This clamping means is so constructed that it may be clamped to the back of the camera in the manner shown in Fig. 1 so that the base member 13 is directly back of the pupillary lens and at an approximate 45° angle to the view finder 12. If desired, the clamping means 14 may obviously be adjustable. The numeral 15 indicates a reflecting surface which may be either of polished metal or glass and which is secured to the upper surface of the base member 13. By this arrangement, the user of the camera may be facing in one direction and his line of sight will follow the approximate line 16—16 to the reflecting surface 15 and through the view finder 12. I have used the numerals 17 and 18 to indicate wings formed on the base member 13 and bent at right angles thereto for providing light shields on either side of the reflecting surface 15.

Figure 4:
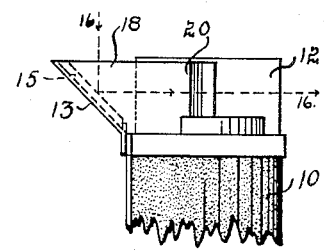
Fig. 4 is an enlarged side elevational view of a camera showing a modified form of structure for securing my reflector unit thereto.
Figure 5:
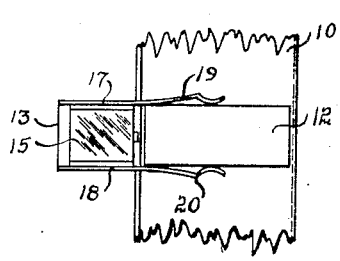
Fig. 5 is an enlarged top view of the structure shown in Fig. 4.

Referring to Fig. 4 of the drawing, it will be noted that instead of the spring clamp 14, the spring clamp fingers 19 and 20 may be used in conjunction with the base member 13 and side shield members 17 and 18 respectively for clasping the reflecting member to the rear of the view finder 12. There are, obviously, a great number of cameras and types of view finders, each of which will necessitate the use of a different type of clamping means for securing my reflecting unit to the camera and in a useable attitude.

Figure 2:
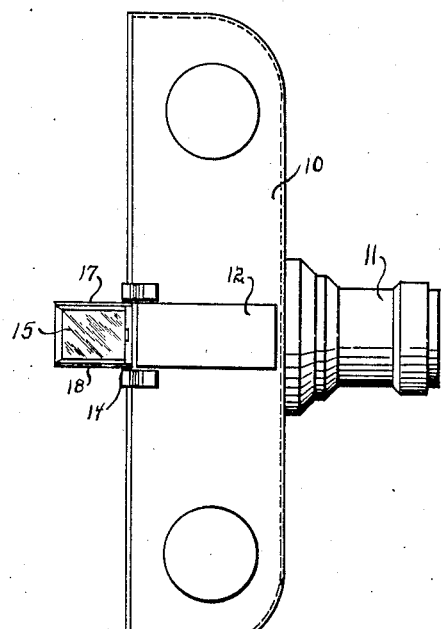
Fig. 2 is a top plan view of the camera and reflector unit.

The practical operation of my device is as follows:

The reflecting unit is secured in a position upon the camera so that the reflecting surface 15 extends outwardly at an approximate 45° angle to the normal line of vision through the view finder of the camera and directly adjacent thereto. The user of the camera may then look directly into the view finder when the camera is in the position shown in Fig. 2, and thus while the user is facing straight forward, the camera may be used for taking pictures at right angles to the direction the user is facing. This makes possible the procurement of entire candid camera snapshots. Obviously my invention relates to the use of the angular reflector in direct combination with the view finder of a camera and this combination may be used on movie cameras, candid cameras, or any type of camera where it is desired to get difficult snapshots or candid snapshots of a subject. Thus it will be seen that I have provided a view finder reflector for cameras which fulfills all of my objects, that is compact, and light in weight, is a definite aid in the taking of candid snapshots, and one which may be easily adapted to all types of cameras. Obviously a glass may be used as illustrated in the drawing for the reflecting surface or the top portion of the base member 13 may be made of bright material for giving a clear reflection through the view finder of a camera.

Some changes may be made in the construction and arrangement of my improved view finder reflector for cameras without departing from the real spirit and purpose of my invention, and it is my intention to cover by my claim any modified forms of structure or use of mechanical equivalents which may be reasonably included within their scope.

I claim:

In a view finding attachment for cameras, an elongated base member, spring clip member formed on each end of said base member for yieldingly securing said base member to the back portion of a camera or like, an angular portion formed on one end of said base member, extending beyond one of said spring clips and having a side shield thereon, a reflecting surface on the inner side of said angular portion; said base portion, said clips, said angular members and said shields being formed of a single sheet of material, and a means formed on said angular portion for holding said reflecting surface on said angular portion.

KENNETH W. MONTGOMERY.